No. 865,456.
PATENTED SEPT. 10, 1907.
W. S. TWINING.
PASSENGER STREET CAR.
APPLICATION FILED JUNE 24, 1907.
3 SHEETS—SHEET 2.
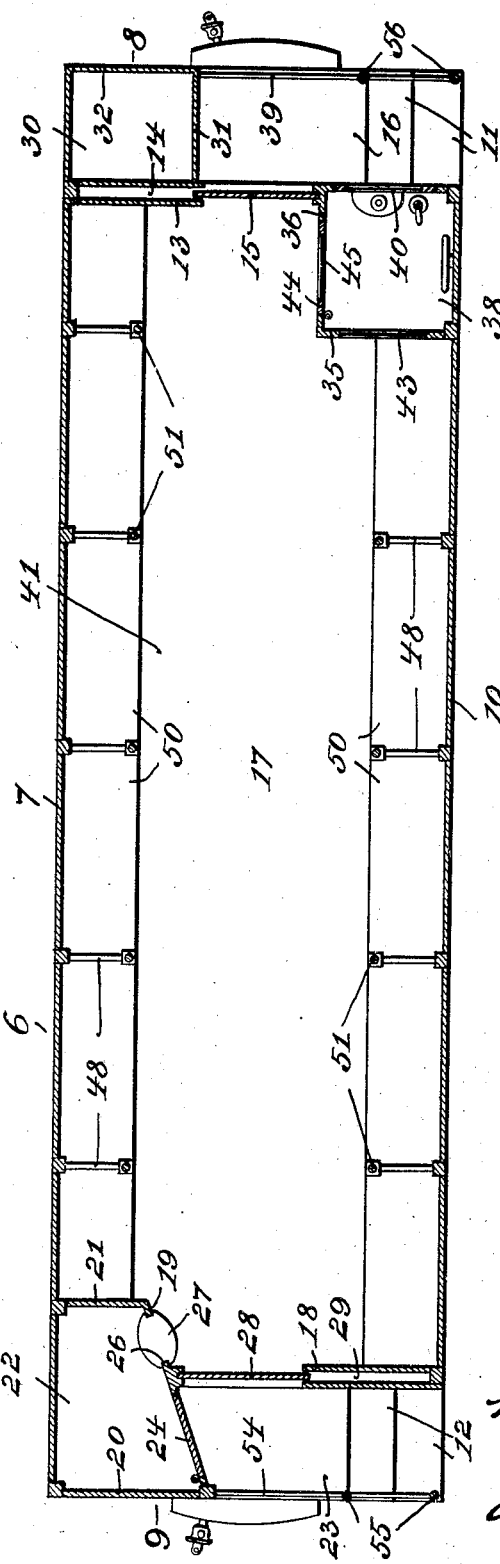

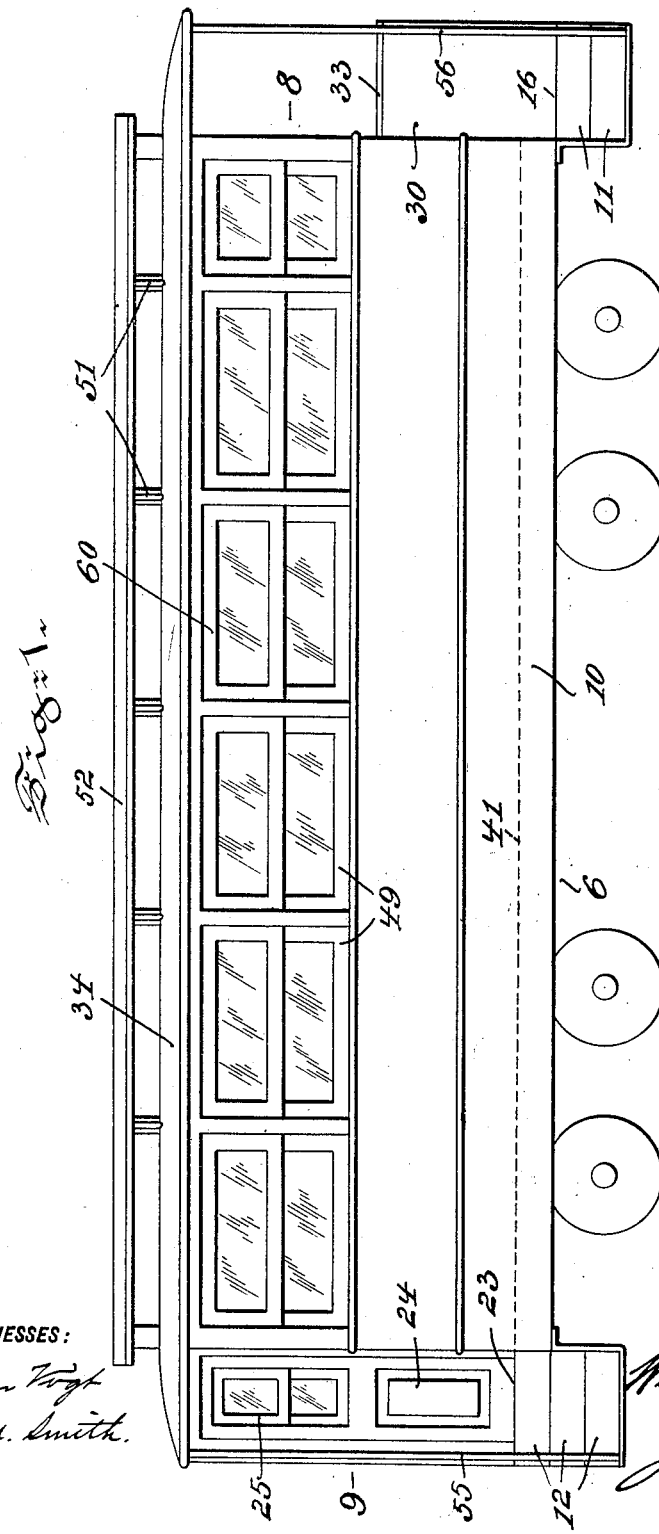

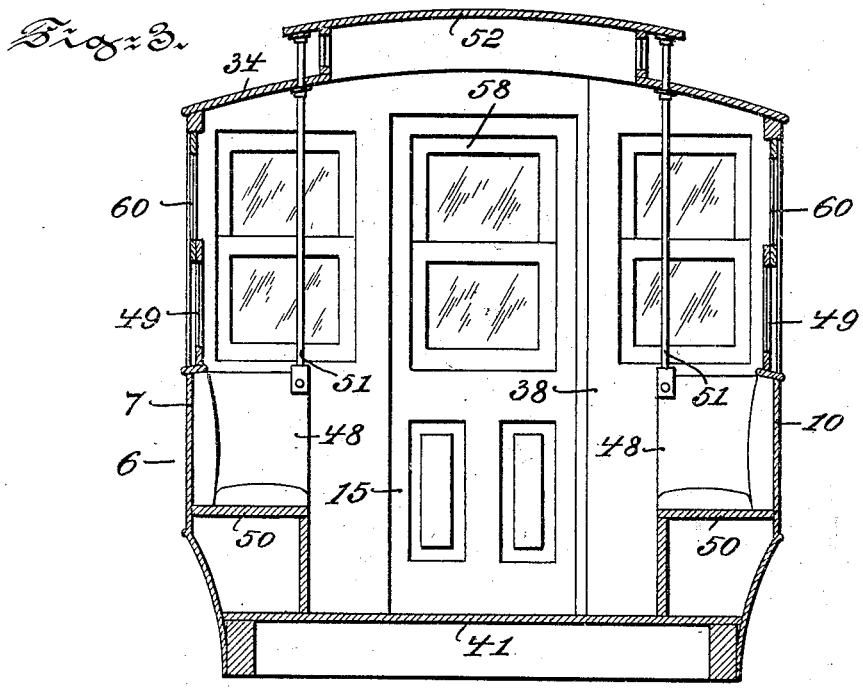
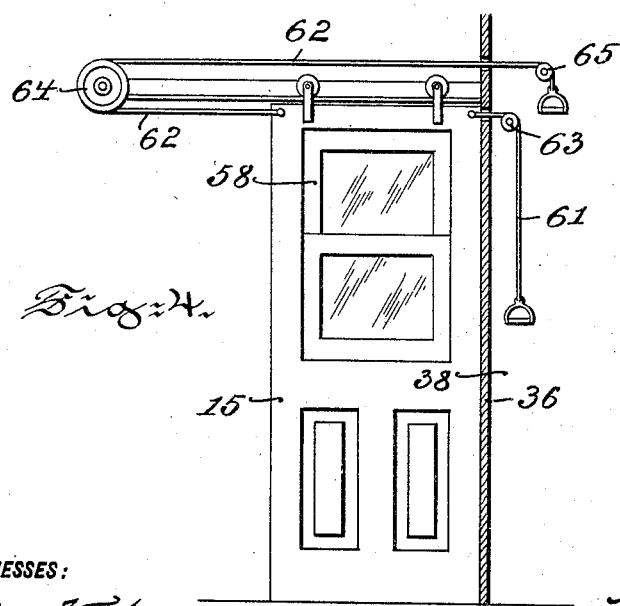

UNITED STATES PATENT OFFICE.

WILLIAM S. TWINING, OF PHILADELPHIA, PENNSYLVANIA.

PASSENGER STREET-CAR.

No. 865,456. Specification of Letters Patent. Patented Sept. 10, 1907.

Application filed June 24, 1907. Serial No. 380,494.

*To all whom it may concern:*

Be it known that I, WILLIAM S. TWINING, a citizen of the United States, residing at the city of Philadelphia, in the county of Philadelphia and Sate of Pennsylvania, have invented certain new and useful Improvements in Passenger Street-Cars, of which the following is a specification.

My invention has relation to a passenger street car of the so-called closed or semi-convertible type; and in such connection it relates to the general constructive arrangement of such a car adapted to be impelled by an electric motor or other means.

The principal objects of my invention are first, to so construct a car as to dispense with vestibules and to so free the car-doors as to permit of direct circulation of air therethrough and hence to more thoroughly ventilate the car; second to so arrange the car as to permit passengers to enter at one end and depart from the opposite end and hence to facilitate boarding and discharging the car; third to so arrange the car as that the entrance is in advance of a motorman's cab so as to enable the person therein to observe the passengers entering the car, without losing sight-control of the condition of the road or street; fourth to so arrange a car with cabs therein for motorman and conductor as to afford them protection from the weather elements and without hampering them, in the discharge of their respective duties in passengers entering and leaving the car; fifth to provide a car with means so as to permit a motorman and a conductor to quickly open and close the respective entrance and exit doors, without leaving their cabs and at the same time permit of the payment of fares by passengers before being permitted to leave the car; sixth to so arrange the conductor's cab as that an unobstructed view is had by such person over the area of the exit steps as well as of the interior of the car and access to the interior, as may be required; seventh to so arrange the car as to provide landings with steps and to enlarge correspondingly the area of floor-space for passengers within the car without the car-body structure being lengthened; eighth to arrange the floor of the cabs for the motorman and conductor on a level with the floor of the car proper so as to permit the occupants of the cabs to better overlook passengers sitting and standing in the car; ninth to arrange a sand-box attachment in front and opposite the entrance steps of the car so as to permit of an instant handling as may be required; and tenth, by extending the under frame of the car structure to the dash-board or railing to provide a car adapted to offer greater resistance to damage or destruction in the event of collision or other accidents and consequently to afford greater safety to passengers with respect to life and limb.

The nature, characteristic features and scope of my present invention will be more fully understood from the following description taken in connection with the accompanying drawings forming part hereof, in which Figure 1, is a view illustrating in side elevation a passenger street car embodying main features of my said invention. Figs. 2 and 3 are respectively, horizontal and cross-sectional views thereof; and Fig. 4 is a detail view, illustrating partly in section and partly in elevation one of the doors of the car and a means for opening and closing the same and arranged to be operated to accomplish such results from one of the cabs of the car.

Referring to the drawings 6, represents the car structure, the side-wall 7, of which extends from the front end 8, to the rear end 9, of the structure 6, while the opposite side-wall 10, of the same terminates a sufficient distance from the ends 8 and 9, to provide the necessary space for entrance steps 11, in front of the car and exit steps 12, in rear thereof. The transverse wall 13, in front of the car connects the side-walls 7 and 10, with each other, and is provided with the necessary space 14, to receive the entrance door 15, when the same is open. The door 15, is arranged in the central longitudinal axis of the car-body structure 6, and separates the landing 16, of the front steps 11, from the interior 17, of the car. At the rear end 9, of the car structure 6, the transverse wall 18, terminates at preferably, an obliquely arranged side-wall 19, which in conjunction with walls 20 and 21, form a continuation of the wall 18, connecting the side-walls 7 and 10, with each other. The walls 19, 20 and 21, in conjunction with the side-wall 7, roof 34, and floor 41, form a small room or cab 22, for the conductor, in rear of the car-body structure 6, which is placed opposite the landing 23, of the rear steps 12, and extends into the interior 17, of the car, as shown in Fig. 2.

In order to enable the conductor to enter his cab 22, without passing through the interior 17, of the car, in the wall 19, is arranged a door 24, leading to the landing 23. As shown in Fig. 1, in the door 24, is arranged a window 25, which permits the conductor within the cab 22, to overlook the landing 23, and exit steps 12, while an opening 26, provides the conductor with an unobstructed view over the entire interior 17, of the car-body structure and the passengers standing and sitting therein. A small table 27, is placed in the opening 26, which serves as counter upon which tickets or car fares may be placed or money changed by the conductor with the passengers. In the rear transverse wall 18, and in the central longitudinal axis of the car-body structure is arranged a door 28, which separates the exit landing 23, from the interior 17, of the car, and which when open is shifted into the space 29, provided in the transverse wall 18, as shown in Fig. 2. The exit door 28, is thus located directly opposite the entrance door 15, at one side of which and opposite the landing 16, is arranged a sand-box attachment 30, formed by walls 31 and 32, in conjunction with the side-wall 7. As shown in Fig. 1, this sand-box attachment covered by a lid 33, does not extend up to the roof 34, of the car body structure, as is the case with the conductor's cab 22. The side wall 7, as well as the walls 19, 20 and 21, extend from the floor 41, and terminate at the roof 34, and are connected with the same in a manner, not shown. A considerable strengthening of the car-body structure is thus effected at the rear end 9, of the same. The strengthening of the car-body structure 6, at the front 8, thereof, is effected by the sand-box attachment 30, arranged outside thereof and within the body structure by walls 35 and 36, respectively, connected with the side-wall 10, transverse wall 13, roof 34, and floor 41, forming a room 38, separated from the interior 17, of the car-body structure 6. This room 38, forms a cab for the motorman and places him directly in front of the entrance steps 11, and in a position, in which he not alone can freely observe each person entering the car, but also overlook the road or street in front of the car. To enable the motorman also to observe small persons or children as well as animals crossing, in front of the car or standing directly in front, a railing 39, is provided in lieu of the usual dash-board alongside the entrance steps 12, and landing 16, terminating at the sand box 30.

The landing 16, is lowered for a distance of one step to permit a motorman to see through the opening 40, arranged in the wall 13, the smallest object in front of the car and the last or uppermost entrance step is therefore formed as a matter of fact by the floor 41, of the car-body structure 6, forming also the floor of the cabs 22 and 38. The cab 38, by being placed inside and at the right hand front corner stiffens the car-body structure 6, at this point and fully protects the motorman from the influences of the weather. By having a free outlook over the sand-box attachment 30, the motorman is able to also observe persons and objects at or moving towards the left of the car or in front of the car, while a window 43, arranged in the wall 35, and a window 45, arranged in the door 44, in the wall 36, of the cab 38, enables the motorman to overlook passengers sitting or standing in the car.

In order to stiffen the car body structure 6, intermediate of the cabs 22 and 38, in the interior 17, are arranged partition-walls 48, connected at their lower ends with the floor 41, and one of the sides with the respective side-walls 7 and 10. The partition-walls 48, terminates preferably at the lower fixed window 49, arranged in the respective side-walls 7 and 10, and serve as supports for seats 50 and rods 51, which latter in conjunction with the walls 48, support the roof 34, and the car body structure 6, and the roof 52, of the monitor, as shown in Fig. 3. Moreover, the partition-walls 48, form numerous corner-seats and the rods 51, handholds arranged in easy reach of the passengers. The rear or exit landing 23, and exit steps 12, are also protected by a railing 54, held in position by rods 55, connected with the landing 23, steps 12 and roof 34, in a similar manner as are the rods 56, of the entrance landing 16, and steps 11, as shown in Figs. 1 and 2.

The respective entrance and exit doors 15 and 28, being unobstructed by the railings 39 and 54, permit when the same are open or their upper drop-sash 58, is lowered, the free passage of air through the central portion of the car-body structure 6, and thus a thorough ventilation of the interior 17, of the car. The ventilation may further be increased by lowering the upper sash 60, of the windows in the sides 7 and 10, of the car-body structure.

To the entrance door 15, are secured ropes or chains 61 and 62, one of which 61, passes over a roller 63, while the rope 62, passes over rollers 64 and 65. The rollers 63 and 65, are arranged in the motorman's cab 38, in which the ends of the ropes 61 and 62 terminate, to enable the motorman by operating the respective ropes to open and close the entrance door 15. A similar arrangement of ropes and pulleys, may be used to permit the conductor to open and close the exit door 28, without leaving the cap 22. The conductor is thereby in a position to enforce at all times payment of car-fares by passengers, before being permitted to leave the car.

Cars of the so-called trailer type propelled by cars to which attached may be arranged in the manner described, with the exception that the motorman's cab, will be dispensed with in such cars.

It will be obvious as to some of the details of internal arrangement of parts constituting salient features of my invention that modifications or changes may be made and still be within the scope of my said invention.

Having thus described the nature and objects of my invention, what I claim as new and desire to secure by Letters Patent is:—

1. In a car of the character described, a car-body structure having a floor and landings, steps terminating at said landings, one of said landings being arranged below the floor of said structure and above the steps leading thereto and a cab for a motorman arranged within the body of the structure behind the lower landing and steps thereof.

2. In a car of the character described, a car-body structure having an extension at one end and a floor, a structure forming a cab for a conductor and arranged partly in said extension and partly in said body structure, a landing arranged in alinement with the floor of said structure and opposite said extension, a second structure forming a motorman's cab arranged within said body structure, a second landing carried by said structure and arranged below the floor thereof and steps connected with each of said landings.

3. In a car of the character described, a body having a sand box attachment at one end parallel to one of the longitudinal walls thereof, a cab arranged at the opposite end and in alinement with said attachment, landings extending respectively from said attachment and cab, and steps leading to said landings and arranged on the other of the longitudinal walls of said body.

4. In a car of the character described, a car-body structure having a floor and openings arranged in each end and in the longitudinal central axis thereof, a door arranged to open and close each of the openings, entrance and exit landings arranged respectively in alinement with the floor and below the same in front of the doors, entrance and exit steps at the ends, terminating at the landings, a structure forming a cab for a conductor arranged in an extension partly outside of the body of said structure and terminating opposite the exit-landing and steps, a structure forming a cab for a motorman arranged within said body structure at the entrance end thereof and both of said structures being arranged sidewise of the longitudinal central axis of said body structure.

5. In a car of the character described, a car-body structure having openings arranged in each end and in the longitudinal central axis thereof, a door arranged to open and close each of the openings, entrance and exit landings in front of the doors, entrance and exit steps at the ends and terminating at the landings, a structure forming a cab for a conductor in an extension of the body of said structure and terminating within said body, a second structure arranged within said body structure and forming a motorman's cab and means for opening said doors from within the conductor's and motorman's cabs.

6. In a car of the character described, a car body structure having side and transverse walls; a floor and a roof, a structure formed of walls connected with each other and respectively with one of the side and transverse walls, a series of partition-walls arranged alongside of each of the side-walls and connected with the same and floor and projecting a certain distance therefrom, seats carried by the partition walls, and a rod supported by each of the partition walls and connected with the roof of said body structure.

7. In a car of the character described, a car body structure having side and transverse walls, a floor and a roof, structures formed of walls respectively connected with one of the sides and one of the transverse walls thereof arranged in opposite corners of the body, a series of partition-walls arranged alongside of the side-walls and connected with the same and floor and projecting a certain distance therefrom, seats carried by the partition walls, and a rod supported by each of the partition-walls and connected with the roof of said body structure.

8. In a car of the character described, a car body structure consisting of side-walls of different lengths and transverse walls extending from the ends of the side-walls of shorter length, a landing carried by the body at each end thereof and arranged with the outer edge in alinement with the ends of the longer side wall of the body, and a structure formed of walls respectively connected with the longer one of the side walls and one of the transverse walls and extending for a certain portion on both sides thereof.

9. In a car of the character described, a car body structure having step-like landings and doors at both ends, a sand-box attachment located opposite one of said landings, motorman and conductor cabs both arranged within the structure and one arranged to form an extension of the body of said structure, the sand-box attachment of said structure arranged to be instantly accessible from outside of the body of said structure.

10. In a car of the character described, a car body structure having landings leading directly to openings, doors respectively connected with said body structure and motorman and conductor cabs respectively located within and partially within and outside of the body of the car-structure.

11. In a car of the character described, a car body structure, consisting of side walls of different length and transverse walls extending from the ends of the side wall of shorter length, a landing carried by the car body structure at each end and arranged with the outer edge in alinement with the ends of the longer side wall, a structure formed of walls respectively connected with the shorter side wall and one of the transverse walls, and a second structure formed of walls respectively connected with the longer side wall and one of the transverse walls and extending for a certain portion on both sides thereof.

12. In a car of the character described, a car body structure, consisting of side walls of different length and transverse walls extending from the ends of the side wall of shorter length, a landing carried by the car body structure at each end and arranged with the outer edge in alinement with the ends of the longer side wall, a structure formed of walls respectively connected with the shorter side wall and one of the transverse walls, a second structure formed of walls respectively connected with the longer side wall and one of the transverse walls and extending for a certain portion on both sides thereof and a series of partition walls arranged within the car body structure and opposite the side walls thereof.

13. In a car of the character described, a car body structure consisting of side walls of different lengths and transverse walls extending from the ends of the side wall of shorter length, a landing carried by the car body structure at each end and arranged with the outer edge in alinement with the ends of the longer side wall, a structure formed of walls respectively connected with the shorter side wall and one of the transverse walls, a second structure formed of walls respectively connected with the longer side wall and one of the transverse walls and extending for a certain portion on both sides thereof, a series of partition walls arranged within the car body structure and opposite the side walls thereof and seats carried by said partition walls.

14. In a car of the character described, a car body structure, consisting of side walls of different lengths and transverse walls extending from the ends of the side wall of shorter length, a landing carried by the car body structure at each end and arranged with the outer edge in alinement with the ends of the longer side wall, a structure formed of walls respectively connected with the shorter side wall and one of the transverse walls, a second structure formed of walls respectively connected with the longer side wall and one of the transverse walls and extending for a certain portion on both sides thereof, a series of partition walls arranged within the car body structure and opposite the side walls thereof, seats carried by said partition walls and rods carried by each of said partition walls to form handholds.

15. In a car of the character described, a car body structure consisting of a floor and roofs, side walls of different lengths with respect to each other, transverse walls extending from the ends of the side walls of shorter length and connected with the floor and one of the roofs, a landing carried by the car body structure at each end and arranged with the outer edge in alinement with the ends of the longer side wall, a structure formed of walls respectively connected with the longer side wall and one of the transverse walls and extending for a certain portion on both sides thereof, a series of partition walls supported by said floor and arranged within the car body structure and connected with the side walls thereof, seats carried by said partition walls, rods carried by said partition walls and forming in conjunction therewith supports for said roofs.

16. In a car of the character described, a car body structure consisting of a floor and roofs, side walls of different lengths with respect to each other, transverse walls extending from the ends of the side wall of shorter length and connected with the floor and one of the roofs, a landing carried by the car body structure at each end and arranged with the outer edge in alinement with the ends of the longer side wall, a structure formed of walls respectively connected with the shorter side wall and one of the transverse walls, a second structure formed of walls respectively connected with the longer side wall and one of the transverse walls and extending for a certain portion on both sides thereof, a series of partition walls supported by said floor and arranged within the car body structure and connected with the side walls thereof, seats carried by said partition walls, rods carried by said partition walls and forming in conjunction therewith supports for said roofs.

17. In a car of the character described, a car body structure, consisting of a floor and roofs, side walls of different lengths with respect to each other, transverse walls extending from the ends of the side wall of shorter length and connected with the floor and one of the roofs, a landing carried by the car body structure at each end and arranged with the outer edge in alinement with the ends of the longer side wall, a structure formed of walls respectively connected with the shorter side wall and one of the transverse walls, a second structure formed of walls respectively connected with the longer side wall and one of the transverse walls and extending for a certain portion on both sides thereof, a series of partition walls supported by said floor and arranged within the car body structure and connected with the side walls thereof, seats carried by said partition walls, rods carried by said partition walls and forming in conjunction therewith supports for said roofs and doors arranged in each of said transverse walls and in the central longitudinal axis of said car body structure and opposite the landings thereof.

18. In a car of the character described, a car body structure, consisting of a floor and roofs, side walls of different lengths with respect to each other, transverse walls extending from the ends of the side wall of shorter length and connected with the floor and one of the roofs, a landing carried by the car body structure at each end and arranged with the outer edge in alinement with the ends of the longer side wall, a structure formed of walls respectively connected with the shorter side wall and one of the transverse walls, a second structure formed of walls respectively connected with the longer side wall and one of the transverse walls and extending for a certain portion on both sides thereof, a series of partition walls supported by said floor and arranged within the car body structure and connected with the side walls thereof, seats carried by said partition walls, rods carried by said partition walls and forming in conjunction therewith supports for said roofs, doors arranged in each of said transverse walls and in the central longitudinal axis of said car body structure and opposite the landings thereof and a railing carried by said landing and arranged parallel to said doors.

In witness whereof, I have hereunto set my signature in the presence of two subscribing witnesses.

WILLIAM S. TWINING.

Witnesses:
THOMAS M. SMITH,
MARTHA A. FLACK.